J. E. SMITH.
PROCESS FOR OBTAINING CARBON BLACK FROM PEAT.
APPLICATION FILED DEC. 8, 1906.
916,049.
Patented Mar. 23, 1909.
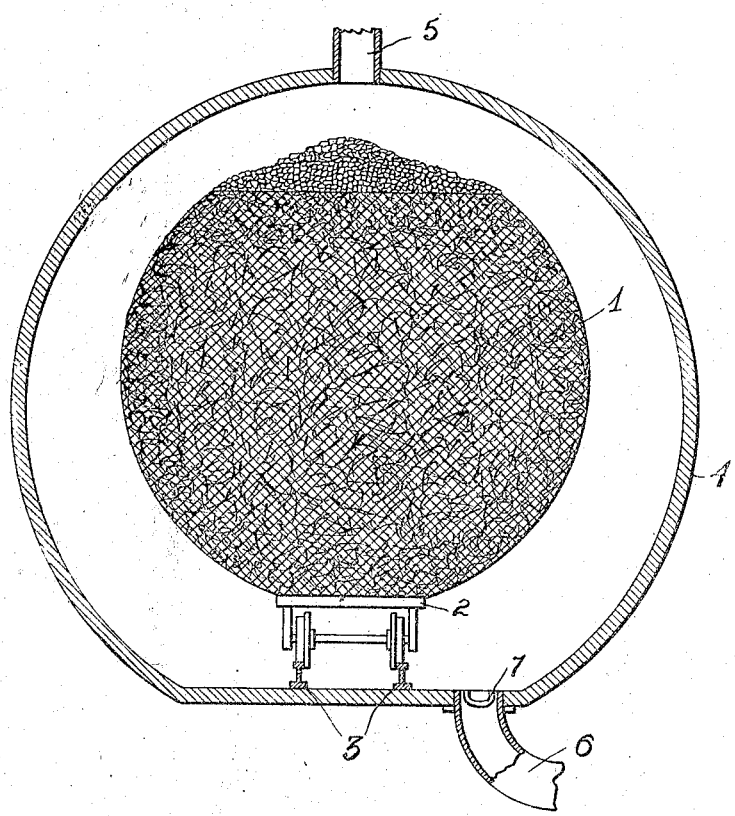
Witnesses
George C. Higham
E. P. Corbett
Inventor
James E. Smith
By Charles A. Brown
Attorney

UNITED STATES PATENT OFFICE.

JAMES E. SMITH, OF CLINTON, IOWA, ASSIGNOR TO NATIONAL PEAT PRODUCTS & CHEMICAL COMPANY, A CORPORATION OF SOUTH DAKOTA.

PROCESS FOR OBTAINING CARBON-BLACK FROM PEAT.

No. 916,049.  Specification of Letters Patent.  Patented March 23, 1909.

Application filed December 8, 1906. Serial No. 346,857.

To all whom it may concern:

Be it known that I, JAMES E. SMITH, citizen of the United States, residing at Clinton, in the county of Clinton and State of Iowa, have invented a certain new and useful Improvement in Processes for Obtaining Carbon-Black from Peat, of which the following is a full, clear, concise, and exact description, reference being had to the accompanying drawings, forming a part of this specification.

My invention relates to an improved process for obtaining carbon black from peat.

The ordinary form of carbon black is the so called lamp black which is carried with the smoke from burning material and such lamp black can also be obtained from the smoke from peat. This carbon black however, retains oily characteristics, and does not readily mix with water. Carbon blacks can also be obtained by the natural drying of peat and then heating thereof in a retort, but the black which is obtained in this manner is also of an oily nature and will not readily mix with water. I find that by drying and treating peat with steam under pressure and then roasting it, the oily matter is entirely removed and the resulting carbon black will readily mix with water.

On the accompanying drawing, I have shown a figure which shows diagrammatically one manner in which the peat can be subjected to the steam drying treatment. Peat is taken in its raw wet state and placed in a suitable receptacle such as the wire receptacle 1 which is conveniently mounted on a truck 2 which can travel on rails 3, into a drying chamber 4 which can be sealed. The contour of the wire basket 1 is preferably like that of the chamber 4 so that there will be a uniform layer of steam around the basket, and the basket being of wire and open at all sides, the steam will be brought into direct contact with the peat. The condensed steam flows off through the outlet 6 which can be controlled by a suitable automatic trap 7. The steam is of suitable pressure, and the temperature should be kept below the temperature of super heat so that the bituminous matter contained in the peat will not be liberated or chemically effected. Good results can be obtained by having the steam a trifle below the temperature of super heat and at a pressure of about 125 pounds per square inch, the steam treatment being applied for about ten hours. This steam treatment breaks up the cellular structure, the cells bursting under the pressure and the moisture being removed therefrom. The oily matter is also driven out and carried away with the steam. The peat after being thus dried and its oily matter removed, is placed in some suitable air tight furnace or retort and heated to drive the gases and foreign substances therefrom, the residue being then carbon black which will readily take to and mix with water. If the carbon black is in the form of lumps or particles, it can be easily pulverized by passage through a fine mesh screen or other pulverizing machinery.

Having thus described my improved process for obtaining from peat carbon black which will readily take and mix with water, I desire to secure the following claims by Letters Patent.

1. The process of obtaining from peat a carbon black which will readily mix with water which consists in first drying the peat by bringing steam under pressure in direct contact therewith, and then roasting or heating the dry peat in a closed furnace or retort to drive therefrom gases and other foreign substances.

2. The process of obtaining from peat a carbon black which will readily mix with water which consists in first drying the raw peat by inclosing it and subjecting it to the direct action of steam under pressure, then heating the dried peat in an air tight furnace or retort to drive the gases and other foreign substances therefrom, and then pulverizing the residue.

3. The process of obtaining from peat a carbon black which will readily mix with water, which consists in first drying the raw peat by inclosing it and subjecting it to the direct action of steam under pressure, then heating the dried peat in an air tight furnace, or retort to drive the gases and other foreign substances therefrom, and then pulverizing the residue by passing it through a fine mesh screen.

In witness whereof, I hereunto subscribe my name this 5th day of December A. D., 1906.

JAMES E. SMITH.

Witnesses:
CHARLES J. SCHMIDT,
GEORGE E. HIGHAM.